Aug. 6, 1946. W. J. BROWN 2,405,133
METHOD AND MEANS FOR MEASURING SURFACE ROUGHNESS
Filed Oct. 7, 1942
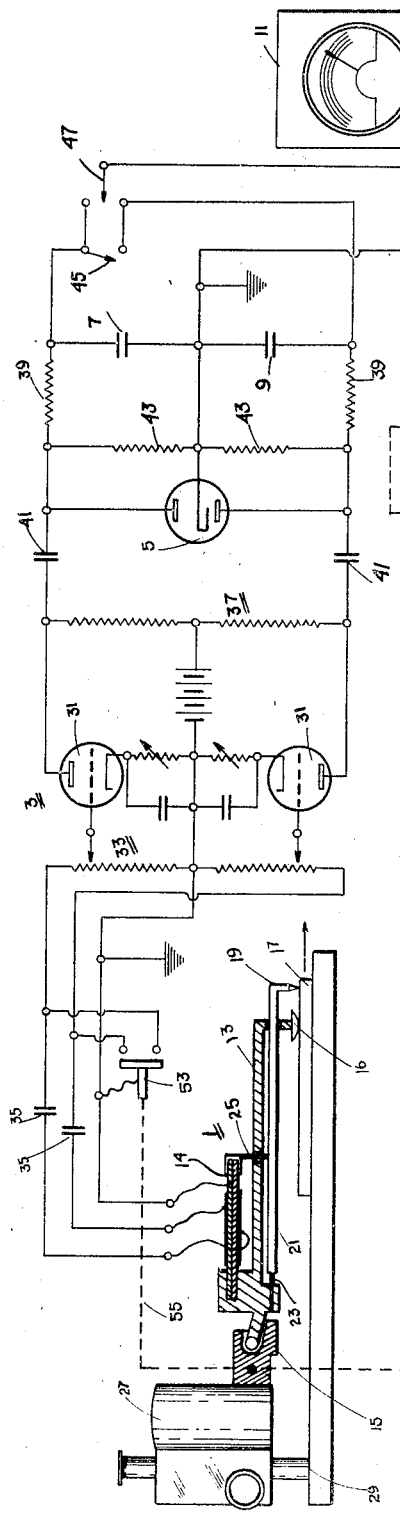
WALTER J. BROWN INVENTOR.
BY
T. R. Goldsborough
ATTORNEY Patented Aug. 6, 1946

2,405,133

UNITED STATES PATENT OFFICE 2,405,133

METHOD AND MEANS FOR MEASURING SURFACE ROUGHNESS

Walter J. Brown, Cleveland Heights, Ohio, assignor to The Brush Development Company, Cleveland, Ohio, a corporation of Ohio Application October 7, 1942, Serial No. 461,123

9 Claims. (Cl. 73—105)

This invention relates to improved methods of and apparatus for measuring the roughness of machine-finished, ground, lapped or polished surfaces such, for example, as those of cylinders, pistons, piston pins or the like.

One of the known methods of attacking the problem of surface roughness measuring is to produce an alternating electric current corresponding to the minute irregularities and thereafter to make, automatically, a visually observable record corresponding thereto, such as a graph. Apparatus for that purpose may comprise a device analogous to a phonograph pickup of the hill-and-dale type having a stylus that is resiliently held in contact with the surface undergoing test and, simultaneously, is moved transversely thereof. The pickup may be of the electromagnetic type that gives a varying output voltage proportional to the velocity of movement of the stylus in the vertical direction as it follows the surface irregularities, exemplified by the United States Patent to Abbott 2,240,278, or it may be of the type including a piezoelectric crystal element. A device of the latter type is employed in the Surface Analyzer manufactured and sold by The Brush Development Company of Cleveland, Ohio; it provides an output potential proportional to the excursions of the tracing-stylus when the pickup is moved over a surface which output, after amplification, may be utilized to actuate a pen-recorder, or to control the deflection of the ray in a cathode ray tube or oscilloscope, if a permanent record is not desired.

Roughness measuring devices of the general type referred to have given excellent results in service; they do have certain limitations, however, which are overcome by the present invention. For example, when measuring either the average or the root-mean-square roughness of a surface, usually expressed in microinches, difficulty sometimes is experienced because the surface, if extended, may vary in its average roughness from point to point. Accordingly, a meter which is intended to indicate either the average or the root-mean-square of the displacement of a stylus that scans such a surface under test will give a continuously varying reading. The reading, to say the least, may be somewhat ambiguous and the ambiguity may increase in proportion to the extent of longitudinal travel of the stylus.

It is, accordingly, an object of this invention to provide a method of and apparatus for roughness measuring that shall give a single definite indication devoid of ambiguity.

Another object is to provide a method of and apparatus for roughness measuring that shall give an unequivocal, distinct and positive indication of the "total roughness" of a surface under observation.

Another object is to provide a method of and apparatus for roughness measuring that shall give an unequivocal indication of the total roughness of a surface either above or below a reference axis or line.

Another object is to provide apparatus of the type described wherein the exploring stylus may follow a track of any desired length or configuration, and at any predetermined rate within reasonable limits, and yet give an unambiguous indication of the total roughness of the track.

The foregoing objects and other objects ancillary thereto are accomplished, in the preferred embodiment of the invention, by causing the stylus of a hill-and-dale pickup of the piezoelectric type to so move at a definite rate transversely of the surface under test, in a path having a definite length, that alternating potentials are developed thereby proportional to the vertical displacements of the said stylus. After suitable voltage amplification, the potentials are translated into alternating current proportional thereto which current is rectified and then integrated, with respect to the time taken by at least one "traverse" of the pickup, to provide a single, unmistakable numerical indication corresponding to the total roughness of the track followed by the stylus.

A meter is provided for measuring the integrated current and it may be calibrated to show "square microinches" or to indicate the product of the length of the stylus track by the mean square of the instantaneous displacement of the stylus, depending upon the type of amplifier, rectifier, and of integrating device utilized.

If desired, the meter reading, if in square microinches, may be divided by the length of the path to provide an indication of the root-mean-square roughness.

The apparatus may be adjusted to give a reading corresponding to a track of any length over which the pickup may be caused to travel, thus rendering it especially adaptable to testing the extended surfaces of cylinders, pistons, piston rods, etc.

The novel features considered characteristic of the invention are set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1 is a conventionalized view, partly diagrammatic and partly in cross-section, exemplifying an embodiment of the invention;

Figure 2 is an enlarged cross-sectional conventionalized view exemplifying the appearance of the profile of a surface of a metallic object after a machining operation;

Figure 3 is a curve illustrating the voltage, after amplification, provided by a piezoelectric pickup which traces a surface of the type shown in Figure 2;

Figure 4 is a curve illustrating the output current from a full wave rectifier when the amplified voltage from the pickup is impressed across the input terminals thereof, and Figure 5 is a graph illustrating the progressive deflection of an indicating meter calibrated to indicate total roughness.

Figure 6 is a portion of an electrical circuit which may be substituted for a portion of the circuit shown in Figure 1.

Referring now to Figure 1 of the drawing, the basic elements of an embodiment of the invention include a pickup device of the hill-and-dale type, designated in its entirety by the numeral 1, an amplifier 3, a rectifier 5, a plurality of capacitors 7 and 9, each having a capacity of the order of 2 microfarads constituting a load circuit for the rectifier, and a meter 11. The pickup device may be analogous to the type utilized in the Surface Analyzer, comprising carrier means 13 on which is mounted a series-connected Rochelle salt multiplate flexing element 14 of the bender type, one end of the carrier having a horizontally reciprocable pivot 15 about which it is movable in a vertical plane and the other end being provided with a hardened positioning shoe 16 that rides on the ridges of the surface of an object 17 being tested. For the purpose of exploring the surface irregularities, a diamond tracer point 19 is disposed adjacent to the positioning shoe, the point being supported for vertical motion by the free end of a lever-arm 21, the other end of the arm being hingedly connected, as by a flat spring 23, to the under side of the carrier 13.

One end of the piezoelectric element is fixedly connected to the pivoted carrier and the free end thereof is connected to an intermediate point on the lever arm by means of a short piece of rigid wire 25 or the like that extends through an opening in the carrier.

Inasmuch as the specific construction of the pickup device per se forms no part of the present invention, only the barest details thereof have been illustrated in a highly conventionalized manner. It should be clear, however, that when the carrier 13 is caused to move horizontally over a surface, the tracer point 19 vertically follows the minor surface irregularities, because of the downward bias imparted thereto by the stiffness of the crystal, and bending forces are applied to the free end of the multiplate flexing element with respect to its fixed end which give rise to corresponding alternating potentials across the output terminals thereof. The crystal element generates a voltage that is directly proportional to stresses imposed thereon at frequencies as low as 3 cycles per second and, consequently, directly proportional to vertical movements of the tracer point. As a result, the sensitivity of the pickup may be expressed in volts per microinch of vertical movement of the point, a figure of .0018 volt being thus obtained in one embodiment of the invention comprising a two-ply multiplate flexing element.

Means (not shown in detail) are provided for causing the pivot 15 of the pickup device to move at a predetermined rate, along a path of predetermined length substantially parallel to the surface being tested. The path may be straight or curved. Alternatively, the pickup may be held in a fixed position and the surface moved relatively thereto. The specific apparatus adopted for obtaining relative motion between the pickup and the surface forms no part of the present invention; it may, for example, be of the type shown in the aforementioned Abbott patent, it may be analogous to the mechanism utilized in the Surface Analyzer, or it may be of any other type capable of imparting motion to the pivot 15 in a path of determinable length with respect to the surface and parallel thereto.

The path may have any length within the capability of the actuating mechanism, depending upon the linear extent or curvature of the surface for which a measurement of total roughness is desired. Preferably, the rate at which the pickup is moved transversely of the surface is constant.

In one well-known commercially available model of the Surface Analyzer, the drive unit for imparting linear motion to the pivot on which the pickup is hinged, contains a 110 volt, 60 cycle A. C. synchronous motor which operates a cam. This cam imparts straight line reciprocating motion to the pivot in a path .06" long in each direction. The motion is accomplished at a uniform velocity and one complete cycle requires ten seconds. The motor and cam mechanism (not shown) may be assembled within a housing 27 which is mounted on a rigid stand 29 equipped with both vertical and horizontal adjustment devices (not shown in detail). In addition to the stand adjustment, in the commercial device, means (not shown) are provided for rotating the pickup arm pivot through any angle, up to 90°, to the direction of drive. This allows measurements to be made on the finished surfaces of very narrow or intricately shaped parts.

The described Brush mechanism itself may be utilized in connection with this invention, but it is preferred to so modify it that the path of travel of the pickup is materially longer in order that a measure of the total roughness of an extended area may be obtained rather than a "picture" of a minute spot thereon. The linear velocity may be much higher than that of the pickup in the standard Brush device, .10" per second having been found to give reasonably satisfactory results in many instances. The rate of pickup travel, however, depends upon a number of factors such as the "pitch" and "depth of scratch" of the surface irregularities, the radius of the tip of the tracer point, the pressure on the tracer point, the range over which the amplifier is linear, etc.

The voltage amplifier 3, to the input circuit of which the leads from the pickup are connected, may be of the push-pull, self-biased linear type, comprising a pair of thermionic tubes 31 and it may be provided with additional conventional means (not shown) for adjusting the gain therein. A mid-tapped calibrated attenuator 33, having a total resistance of the order of 4 megohms, may be included in circuit between the pickup and the amplifier to provide various degrees of overall magnification of the surface irregularities. A blocking capacitor 35 may be serially included in each of the connections extending between the electrodes of the piezoelectric element and the ends of the attenuator for the purpose of preventing the application of unidirectional potentials to the crystal sections.

The output circuit of the amplifier, across which an amplified alternating potential proportional to the excursions of the tracer point appears during operation of the apparatus, preferably is non-inductive in character and it may be constituted by a mid-tapped resistor 37 having a total resistance of the order of 100,000 ohms.

The output potential, for example, would have a wave shape exemplified by Figure 3 of the drawing in the event that a surface of the variety shown in Figure 2 is being tested. From Figure 3 it will be noted that the system itself establishes a reference, or zero axis such that the area of the amplified alternating potential curve above it is substantially the same as the area below. While it is not strictly true that the zero axis corresponds precisely to an imaginary "mean" surface of the element under test, it may be said, for the purpose of this disclosure, to represent such a surface.

In connection with the foregoing paragraph, it should be clearly kept in mind that Figure 2 is not a view of an actual surface profile such as may be found in profusion in the publication by Arthur M. Swigert, Jr., entitled "The Story of Superfinish," but is a conventionalized enlarged view of a finely turned surface profile such as might be formed by an extremely small tool having a slightly rounded cutting edge. The contrast between the rounded scratches and the sharp ridges of such a surface has been exaggerated intentionally for the purpose of more clearly explaining the theory underlying this invention.

In order to provide a measure of the total roughness of the profile of the surface traced by the pickup-stylus or, in other words, a measure of the integral of the actual curve traced thereby in the vertical plane, above and below the zero line, as the pickup arm moves at the predetermined rate a definite distance over the surface, calibrated means may be provided for directly totalizing the power expended in the output resistor 37 of the amplifier 3 during movement of the stylus once along its path. Such means might be constituted by a meter analogous to a watt-hour-meter, a calorimeter or the like.

It is preferred, however, to connect the full wave rectifier 5 across the output resistor 37 of the push-pull amplifier and to utilize the rectified current pulses provided thereby to charge the two load-capacitors 7 and 9. A resistor 39 of the order of 1 megohm, or larger, is included in series with each capacitor, to provide a time constant of the order of magnitude of or greater than the time period required by the tracer-point to move once over its predetermined path. A small blocking capacitor 41, of the order of .001 microfarad, is interposed between each anode of the rectifier and the corresponding terminal of the output desistor, and a leakage path for each blocking capacitor is provided by a ½ megohm resistor 43 individually connected between it and the cathode of the rectifier.

A switch 45 is provided whereby the two load capacitors 7 and 9 may be connected in parallel, and additional switching means 47 whereby the meter 11, preferably of the well-known vacuum tube type, may be utilized to indicate the potential across either the capacitor 7 or 9 or across both capacitors in parallel. The meter may be provided with a plurality of scales, calibrated, for example, in square microinches and corresponding, respectively, to the various lengths of path that the particular device is designed to trace.

In operating the apparatus in accordance with the preferred method, the mechanism that causes the pickup device 1 to move transversely across a surface to be measured is so adjusted that the length of the path and the rate of travel of the carrier is commensurate with the type of surface to be inspected and the frequency range of the amplifier. Alternatively, the surface to be investigated may be caused to move, with respect to the pickup device, in the direction of the arrow appearing in Figure 1.

A switch 49 is provided for discharging the capacitors 7 and 9 just previous to the making of a measurement. The switch may be connected across the input terminals of the voltmeter, as shown in Figure 1. It may be manually operated, or a mechanical connection, indicated by the dotted line 51, such as a cam or the like, indicated by the rectangle 52, actuated by the pickup driving means, may be employed to momentarily close the switch after one measurement has been made and before a second measurement is started. An additional shorting switch 53 may also be provided, for the purpose of rendering the amplifier active only during definite portions of the cycle of movement of the pickup device, thereby fixing the path length and the measurement time. The switch 53 could be connected across the output terminals of the pickup, as illustrated, and means, indicated by the dotted line 55, could be provided whereby it is open only during a predetermined portion of the time during which the pickup is moving in either direction, and closed during the balance of the cycle over which a measurement is not wanted.

Insofar as this invention is concerned, the exact mechanism by means of which the switches 49 and 53 are timed with respect to the travel-cycle of the pickup device is immaterial and such mechanism, whether mechanical or electrical in character, could easily be designed by anyone skilled in the art. A showing of actual mechanism, therefore, is not believed to be necessary.

If care is exercised in choosing the component parts of the apparatus and if electrical leakage is reduced to the minimum, the increments of electric charge acquired by the paralleled capacitors 7 and 9 during one movement of the tracer point at a predetermined rate in one direction over its path may be represented by a curve such as the one shown in Figure 4. The final charge resulting from one trip of the tracer point, therefore, is proportional to the summation of the cross-sectional areas of all of the ridges above the reference axis and of the projected areas of the valleys, or scratches, below the said axis or, in other words, is proportional to the total roughness of the path. The final potential of the capacitors in parallel is proportional to the charge and the voltmeter may, accordingly, be calibrated to directly indicate square microinches of total roughness for any path length.

It should be kept in mind that the term "total roughness" has been chosen arbitrarily to designate the type of indication that the apparatus provides. If the surface tested has a profile that is sine-wave in character, the actual total roughness thereof, or the total area of the ridge cross-sections along the path, measured up from the bottoms of the scratches instead of from the reference axis determined by the constants of the apparatus, would be obtained, approximately, by multiplying the meter reading by $\pi/2$. A perfect sine-wave surface, of course, is never found in practice and the meter reading, for practical purposes, may be accepted as a fair measure of the total roughness.

The foregoing explanation of the operation of apparatus constructed according to this invention is predicated upon the assumption that the amplifier 3 is linear and that the rectifier is also linear.

In the event that it is desired to ascertain the root-mean-square roughness in microinches, for example, a square-law full-wave rectifier may be utilized instead of the diode 5. In that case, provided the capacitors 7 and 9 are connected in parallel, the meter will give a reading proportional to the product of the length of the path traced multiplied by the mean square of the stylus displacement from the reference axis. By suitable calibration of the meter itself, by reference to appropriate charts, the meter reading may be translated into a root-mean-square figure in microinches, if desired.

Figure 6 illustrates a circuit which may be used for obtaining the root-mean-square roughness of a surface. The circuit illustrated in Figure 1 from the condensers 41 to the meter 11 is replaced by the circuit of Figure 6. The gain of the amplifier 3 is set sufficiently low that the rectifier 5 is worked at peak values of .5 volt or less. The rectified output is then amplified by the direct current amplifier 44, and is applied to a meter 12 calibrated in root-mean-square microinches.

In the event that the bottoms of the scratches are rounded and the ridges are sharp, the charge acquired by the capacitor 7, when a rectifier of the square law type is employed, will tend to differ from that acquired by the capacitor 9 provided they are not connected in parallel by the switch 46. The meter, therefore, through operation of the switch 47 connected to the input terminals thereof, may be utilized to obtain a reading corresponding to the total roughness, or scratches, below the reference axis or of the total roughness, or ridges, above the axis. Such readings have possible utility in many fields.

The method of total roughness measuring according to this invention offers a number of advantages that will be obvious to those skilled in the art. Inasmuch as the meter may be provided with "pass" and "reject" indicia, the necessity for interpreting a meter reading or a record is eliminated and the time required for surface-testing a large number of objects, such as piston pins or the like, is much less than that required by methods and apparatus heretofore known. At the same time, an accurate indication of either the average roughness, or the root-mean-square roughness, in microinches, may be obtained if desired.

Although certain specific embodiments of the invention have been chosen for the purpose of explanation, it is realized that many modifications thereof will be apparent to those skilled in the art to which it pertains. The invention, therefore, is not to be restricted except insofar as is necessitated by the prior art and by the spirit of the appended claims.

What is claimed is:

1. The method of investigating an irregular surface through utilization of an electrical pickup device of the type including carrier means on which are mounted a movable tracer point and means operable by said point for generating a fluctuating electrical signal related to excursions of said point with respect to the carrier means, that comprises bringing the point into contact with the surface, causing relative movement at a constant known rate between the carrier means and the surface transversely of the direction in which the tracer point is movable and along a path of predetermined length thereby producing a fluctuating electrical signal, dividing said fluctuating electrical signal into a first fluctuating electrical signal representative of the surface peaks and a second fluctuating electrical signal representative of the scratches, and deriving from said first and second electrical signals further electrical signals proportional to the squares of the instantaneous values thereof, integrating said derived signals and measuring the integrated signals to provide an indication of the total roughness of the peaks, or of the scratches or of both.

2. In combination, an electrical pickup device of the type including carrier means on which are mounted a movable tracer point and means operable by the point for generating an electrical potential proportional to the excursions of said point with respect to the carrier means, amplifying and rectifying means for providing unidirectional electrical current proportional to the square of the instantaneous potentials generated by the pickup, condenser means for integrating the output from the rectifier and means for measuring the integrated output.

3. In combination, an electrical pickup device of the type including a tracer point movable with respect to a specimen and means operable by said point for establishing a fluctuating electrical signal related to excursions of said tracer point induced by said specimen, amplifier means for amplifying the fluctuating electrical signal, first half-wave rectifier means connected to the amplifier means to pass the positive half-cycles of the said fluctuating electrical signal, second half-wave rectifier means connected to the amplifier means to pass the negative half-cycles of the said fluctuating electrical signal, one of the elements in the group comprised of the pickup device, the amplifier, and the rectifier means having a square-law response, first and second condenser means connected to the said first and second half-wave rectifier means, one of said condenser means being charged only when one of said half-wave rectifier means passes current, and the other condenser means being charged only when the other of said half-wave rectifier means passes current, indicating means, and means for selectively connecting only the first condenser means, or only the second condenser means, or simultaneously both condenser means to the indicating means for giving an indication of the mean-square roughness of only the peaks or only the valleys of the surface of the specimen, or of the total roughness of the surface of the specimen.

4. In combination, an electrical pickup device of the type including a tracer point movable with respect to a specimen and means operable by said point for establishing a fluctuating electrical signal related to excursions of said tracer point induced by said specimen, amplifier means for amplifying the fluctuating electrical signal, first half-wave rectifier means connected to the amplifier means to pass the positive half-cycles of the said fluctuating electrical signal, second half-wave rectifier means connected to the amplifier means to pass the negative half-cycles of the said fluctuating electrical signal, integrating means connected to the said first and second half-wave rectifier means and being responsive to separately integrate the positive and negative half-cycles which are passed by said rectifier means, one of the elements in the group comprised of the pickup device, the amplifier, the rectifier, and the integrator having a square-law response, indicating means connected to said integrating means, and means including said integrating means and said indicating means for selectively establishing an indication of the mean-square value of only the integrated positive half-cycles or of only the integrated negative half-cycles, or of the integrated positive and negative half-cycles together.

5. In combination, an electrical pickup device of the type including a tracer point movable with respect to a specimen and means operable by said point for establishing a fluctuating electrical signal related to excursions of said tracer point induced by said specimen, amplifier means for amplifying the fluctuating electrical signal, first half-wave rectifier means connected to the amplifier means to pass the positive half-cycles of the said fluctuating electrical signal, second half-wave rectifier means connected to the amplifier means to pass the negative half-cycles of the said fluctuating electrical signal, first integrating means connected to the first of said rectifier means for integrating the signal passed by said rectifier, second integrating means connected to the second of said rectifier means for integrating the signal passed by said rectifier, one of the elements in the group comprised of the pickup device, the amplifier, the rectifier means, and the integrating means having a square-law response, indicating means, and means for selectively connecting only the first integrating means, or only the second integrating means, or simultaneously both integrating means to the said indicating means for giving an indication of only the peaks or only the valleys of the surface of the specimen, or of the total roughness of the surface of the specimen.

6. In a device for determining the mean-square roughness of a surface, a pickup system including stylus means for giving an output signal which is a function of the instantaneous vertical stylus displacement due to surface roughness as said stylus is caused to move across the surface, full-wave rectifier means for rectifying the output signal from said pickup system, means including a condenser for integrating the rectified signal output from said rectifier means, and indicating means for indicating the value of the integrated signal, one of the elements in the group comprised of the pickup means, the rectifier means, and the integrating means having a square-law response whereby the indicating means after calibration in accordance with both the length and speed of trace of the stylus across the specimen gives an indication of the mean-square roughness of the surface of the specimen.

7. The invention as set forth in claim 6 characterized in that there is an amplifier means for amplifying the output signal from said pickup system, and that said amplifier means is included in the group of elements one of which has a square-law response.

8. In combination, an electrical pickup device of the type including a stylus movable with respect to and over a given trace of a specimen and means operable by said stylus for establishing a fluctuating electrical signal related to excursions of said stylus induced by roughness of said specimen, a condenser, and circuit means including a rectifier connected to said pickup device and to said condenser for supplying to the condenser charging current substantially proportional to the rectified electrical signal, said circuit means being adapted to deliver substantially constant current to said condenser for a constant applied electrical signal for a period of time at least equal to the time of the trace, and means for measuring the charge on the condenser whereby an indication is obtained which is representative of the average roughness of the specimen over the given trace.

9. The combination as set forth in claim 8, further characterized by resistor means in series with said condenser and located between the output of said rectifier and said condenser, said resistor being of such a value that a time constant is established for said condenser of the order of magnitude of or greater than the time period required for the stylus to move once over its predetermined path.

WALTER J. BROWN.